United States Patent
Mauri et al.

(10) Patent No.: US 12,230,944 B2
(45) Date of Patent: Feb. 18, 2025

(54) JOINT FOR ELECTRICAL CABLES AND METHOD FOR JOINTING

(71) Applicant: NEXANS, Courbevoie (FR)

(72) Inventors: Massimiliano Mauri, Borgenhaugen (NO); Erik Markus Jarvid, Kungälv (SE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/731,171

(22) Filed: Apr. 27, 2022

(65) Prior Publication Data

US 2022/0376483 A1    Nov. 24, 2022

(30) Foreign Application Priority Data

Apr. 30, 2021   (EP) .................................... 21305568

(51) Int. Cl.
H02G 1/00 (2006.01)
H02G 1/14 (2006.01)
H02G 15/00 (2006.01)
H02G 15/196 (2006.01)

(52) U.S. Cl.
CPC ........... *H02G 1/145* (2013.01); *H02G 15/003* (2013.01); *H02G 15/196* (2013.01)

(58) Field of Classification Search
CPC ..... H02G 1/145; H02G 15/003; H02G 15/196
See application file for complete search history.

(56) References Cited

U.S. PATENT DOCUMENTS

| | | | |
|---|---|---|---|
| 10,777,988 B2 * | 9/2020 | Marthinsen | H02G 15/003 |
| 2013/0175068 A1 * | 7/2013 | Sutton | C08L 23/06 |
| | | | 174/110 SR |
| 2014/0338953 A1 * | 11/2014 | Seraj | H01R 43/26 |
| | | | 174/138 F |
| 2017/0309366 A1 | 10/2017 | Larche et al. | |
| 2018/0241190 A1 * | 8/2018 | Gyppaz | H02G 3/0412 |

FOREIGN PATENT DOCUMENTS

| | | | | |
|---|---|---|---|---|
| GB | 2 108 329 | | 5/1983 | |
| JP | 2000 228813 | | 8/2000 | |
| WO | WO-2017088899 A1 * | | 6/2017 | H01B 13/0026 |

OTHER PUBLICATIONS

Ho et al. ; CN 112271657 Polypropylene 10kV molded cable connector and manufacturing method thereof English Translation; published on Jan. 26, 2021 (Year: 2021).*
Li et al. ; CN 211980229 English Translation published on Nov. 20, 2020 (Year: 2020).*
CN112271657 A published on Jan. 26, 2021 English Translation (Year: 2021).*
CN 211980229 U English Translation (Year: 2020).*
CN112271657 ; English Translation). (Year: 2020).*
WO 2017/088899 A1 (Year: 2017).*
European Search Report dated Sep. 29, 2021.

* cited by examiner

*Primary Examiner* — Pete T Lee
(74) *Attorney, Agent, or Firm* — IPSILON USA, LLP

(57) ABSTRACT

An insulation system for jointing of high voltage conductors has an inner layer made of a crosslinked first polymeric semiconducting material, an intermediate insulating layer made of a thermoplastic polymeric insulating material, and an outer layer made of a second polymeric semiconducting material. The insulation system is adapted for surrounding the electric conductor joint.

11 Claims, 4 Drawing Sheets

JOINT FOR ELECTRICAL CABLES AND METHOD FOR JOINTING

RELATED APPLICATION

This application claims the benefit of priority from European Patent Application No. 21 305 568.4, filed on Apr. 30, 2021, the entirety of which is incorporated by reference.

FIELD OF THE INVENTION

The present invention relates to high voltage electric cable connections. More particularly, the invention relates to a mixed crosslinked and thermoplastic insulation system for jointing of high voltage conductors and to a method for jointing of high voltage conductors.

BACKGROUND

EP0079118 describes a multilayer, heat shrinkable composite tube covering for a cable joint structure in which intimately joined layers define a semiconductive inner conductor shield, an insulation layer, and an outer insulation shield. The joint comprises an inner semi-conducting layer, an intermediate insulation layer and an outer semi-conducting layer. Each layer is made of a cured or crosslinked polymer.

EP0379056 describes joints of electric cables and a tubular covering for joints which is destined to encircle the connection between the conductors of the cables and to tighten elastically on the ends of these latter which face each other. The joint comprises an inner semi-conducting layer, an intermediate insulation layer and an outer semi-conducting layer. Each layer is made of a crosslinked polymeric material.

EP3365952 describes a joint for medium/high voltage electric cables having a thermoplastic insulation system. The insulation system comprises an inner semi-conducting layer, an intermediate insulation layer and an outer semi-conducting layer. Each layer is made of a thermoplastic polymeric material.

WO2015197686 describes a joint for high voltage electric cables having an insulation system. The insulation system comprises an inner semi-conducting layer, an intermediate insulation layer and an outer semi-conducting layer. Each layer is made of a thermoplastic polymeric material.

Several solutions for insulation system for jointing of high voltage conductors are known, but all have various disadvantages that should be overcome.

One such problem when integrating thermoplastic polymeric material in the insulation system of the joint is that the traditional lapping method may not be viable anymore since the lack of cross-linking will allow material deformation during the melting procedure. An alternative is to use a direct injection moulding procedure. However, this procedure requires highly specialized equipment and the jointing needs to be performed in two steps in order to account for density/volume change in the material.

OBJECTS AND SUMMARY OF THE INVENTION

The goal of the present invention is to provide a new and advantageous insulation system for jointing of high voltage conductors. In particular, the present invention provides a mixed crosslinked and thermoplastic insulation system for jointing of high voltage conductors.

The present invention is defined by the appended claims and in the following.

In a first aspect, the present invention provides a joint for joining a first electric cable and a second electric cable, each cable comprising an electric conductor and an insulation system surrounding the electric conductor, the insulation system comprising an inner semiconducting layer, an insulating layer and an outer semiconducting layer, wherein the end sections of the two electrical conductors form an electrical conductor joint; the joint comprising:
- an inner layer made of a crosslinked first polymeric semiconducting material, for surrounding the electric conductor joint,
- an intermediate insulating layer made of a thermoplastic polymeric insulating material, covering an external surface of the inner semiconducting layer, and
- an outer layer made of a second polymeric semiconducting material, covering an external surface of the insulating layer.

Thermoplastic materials are defined as polymers that can be melted and recast almost indefinitely. They are molten when heated and harden upon cooling. The polymer network of a thermoplastic material forms and/or breaks up as the temperature is changed.

Crosslinking is the general term for the process of forming covalent bonds or relatively short sequences of chemical bonds to join two polymer chains together.

A crosslinked polymer is a polymer that has undergone the crosslinking process.

Here the person skilled in the art will understand that when a layer is described to be made of a crosslinked polymer, it means that the crosslinking can happen before or after the formation of the layer.

Typical crosslinking processes known in the art can be used to obtain the desired crosslinking, for example cured by heat, pressure, radiation or similar.

In an embodiment of the joint, the inner semiconducting layer is in direct contact with the electrical conductor.

In an embodiment of the joint, the second polymeric semiconducting material may be a thermoplastic semiconducting material.

In an alternative embodiment of the joint, the second polymeric semiconducting material may be a crosslinked semiconducting material.

In an embodiment of the joint, the intermediate insulating layer is in direct contact with the inner semiconducting layer.

In an embodiment, the thermoplastic polymeric insulating material comprises a polymer matrix selected from one or more polyolefins such as, for example but not limited to: polypropylenes of various stereoregularity (atactic PP, isotactic PP, syndiotactic PP etc), block copolymer polypropylenes, and PP copolymers, polyethylene (PE, HDPE, LDPE, LLDPE, MDPE) and its copolymers, thermoplastic olefins (TPOs), and a mixture of thereof.

In another embodiment, the thermoplastic polymeric insulating material comprises a dielectric fluid.

In another embodiment, the thermoplastic polymeric insulating material comprises additives such as antioxidants, stabilizers, etc.

In another embodiment, the thermoplastic polymeric insulating material comprises a polymer matrix selected from one or more polyolefins such as polypropylene and its copolymers, thermoplastic olefins (TPOs), or mixture of thereof; optionally a dielectric fluid; and optionally additives such as antioxidants, stabilizers, etc.

In an embodiment, the crosslinked first polymeric semiconducting material comprises a polymer matrix selected from one or more polyolefins such as, for example but not limited to: polypropylenes of various stereoregularity (atactic PP, isotactic PP, syndiotactic PP etc), block copolymer polypropylenes, and PP copolymers, polyethylene (PE, HDPE, LDPE, LLDPE, MDPE) and its copolymers, thermoplastic olefins (TPOs), and a mixture of thereof.

In another embodiment, the crosslinked first polymeric semiconducting material comprises additives to increase conductivity such as acetylene black, furnace black, carbon nanotubes, graphene and the likes, and combinations thereof.

In another embodiment, the crosslinked first polymeric semiconducting material comprises a dielectric fluid.

In another embodiment, the crosslinked first polymeric semiconducting material comprises additives such as antioxidants, stabilizers, etc.

In another embodiment, the crosslinked first polymeric semiconducting material comprises a crosslinking agent such as a peroxide (for example dicumyl peroxide, di-tert-butyl peroxide, cumene hydroperoxide, 1,3-bis(tert-butylperoxyisopropyl)benzene and similar).

In another embodiment, the crosslinked first polymeric semiconducting material comprises a crosslinking boosting agent such as, for example, trimethylolpropane trimethacrylate (TMPTMA) and similar, or a polyolefin copolymer boasting insaturations such as vinyl groups, C—C π-bonds etc.

In an embodiment, the crosslinked first polymeric semiconducting material comprises a polymer matrix selected from a single material or a mixture of materials such as PP and its copolymers, PE and its copolymers or thermoplastic olefins (TPOs); an additive to increase conductivity such as acetylene black, furnace black, carbon nanotubes, graphene and the likes; optionally a dielectric fluid; optionally additives such as antioxidants, stabilizers, etc; optionally a crosslinking agent such as a peroxide and optionally a crosslinking boosting agent.

In an embodiment, the second polymeric semiconducting material comprises a polymer matrix selected from one or more polyolefins such as, for example but not limited to: polypropylenes of various stereoregularity (atactic PP, isotactic PP, syndiotactic PP etc), block copolymer polypropylenes, and PP copolymers, polyethylene (PE, HDPE, LDPE, LLDPE, MDPE) and its copolymers, thermoplastic olefins (TPOs), and a mixture of thereof.

In an embodiment, the second polymeric semiconducting material comprises additives to increase conductivity such as acetylene black, furnace black, carbon nanotubes, graphene and the likes and combinations thereof.

In an embodiment, the second polymeric semiconducting material comprises a dielectric fluid.

In an embodiment, the second polymeric semiconducting material comprises additives such as antioxidants, stabilizers, etc.

In an embodiment, the second polymeric semiconducting material comprises a polymer matrix selected from a single material or a mixture of materials such as PP and its copolymers, PE and its copolymers or thermoplastic olefins (TPOs); an additive to increase conductivity such as acetylene black, furnace black, carbon nanotubes, graphene and the likes; optionally a dielectric fluid; and optionally additives such as antioxidants, stabilizers, etc.

In an embodiment of the joint, the first electric cable has a thermoplastic insulation system, i.e. all layers of the insulation system surrounding the electric conductor are made of a thermoplastic polymer.

In another embodiment of the joint, the first electric cable has a crosslinked insulation system, i.e. all layers of the insulation system surrounding the electric conductor are made of a crosslinked polymer.

In another embodiment of the joint, the first and the second electric cables have a thermoplastic insulation system.

In another embodiment of the joint, the first and the second electric cables have a crosslinked insulation system.

In another embodiment of the joint, one of the first and the second electric cables has a thermoplastic insulation system while the other has a crosslinked insulation system.

In another embodiment of the joint, at least one of the layers of the insulation system surrounding the electric conductor of the first and/or the second electrical cable is a thermoplastic insulation system.

In another embodiment of the joint, the inner semiconducting layer, the insulating layer and the outer semiconducting layer are each thermoplastic material.

In another embodiment of the joint, each cable, the inner semiconducting layer, the insulating layer and the outer semiconducting layer are each made of thermoplastic material.

In a second aspect, the present invention provides a method for manufacturing an electric cable joint, the method comprising the steps of:
a) providing a first and a second electric cables, each cable comprising an electric conductor and an insulation system surrounding the electric conductor, the insulation system comprising an inner semiconducting layer, an insulating layer and an outer semiconducting layer;
b) joining the respective terminal portions of the electric conductors of the first electric cable and of the second electric cable to form an electric conductor joint;
c) surrounding the electric conductor joint with a joint inner layer made of a crosslinked first semiconducting material;
d) surrounding the joint inner layer with a joint insulating layer made of a thermoplastic insulating material; and
e) surrounding the joint insulating layer with a joint outer layer made of a second semiconducting material.

In other words, the terminal portion of the first electric conductor is placed axially adjacent to the terminal portion of the second electric conductor when the electric conductors are joined.

Although steps c), d), and e) are described as consecutive steps in the method, the person skilled in the art will understand that in some cases it will be advantageous to perform these steps at the same time.

In an embodiment of the method, the first polymeric material, the second polymeric material etc. may be as defined for the joint according to the first aspect of the invention.

In another embodiment of the method, the crosslinked first semiconducting material may be applied by tape lapping, and optionally degassed in step c) to form the joint inner layer.

In another embodiment, the thermoplastic insulating material may be applied by tape lapping, injection moulding, 3D-printing or as a pre-moulded part in step d) to form the joint insulating layer.

In another embodiment, the second semiconducting material may be applied by tape lapping, injection moulding, 3D-printing or as a pre-moulded element in step e) to form the joint insulating layer.

In an embodiment of the method, the thermoplastic insulating material and the second semiconducting material may be provided in the form of at least a pre-moulded element. In other words, such that steps d) and e) may be performed at the same time.

The at least one pre-moulded element is adapted for surrounding the electric conductor joint and constitutes a cylindrical layer around the previous layer. The person skilled in the art will understand that a cylindrical layer refers to a hollow cylindrical layer or a tube-shaped cylindrical layer.

In a third aspect, the present invention provides a cable comprising a joint according to the first aspect of the invention.

In an embodiment of the cable, the cable comprising two cable sections and a joint, each cable section comprising an electric conductor and an insulation system surrounding the electric conductor, the insulation system comprising an inner semiconducting layer, an insulating layer and an outer semiconducting layer, wherein the end sections of the two electrical conductors form an electrical conductor joint; the joint comprising:
- an inner layer made of a crosslinked first polymeric semiconducting material, for surrounding the electric conductor joint,
- an intermediate insulating layer made of a thermoplastic polymeric insulating material, covering an external surface of the inner semiconducting layer, and
- an outer layer made of a second polymeric semiconducting material, covering an external surface of the insulating layer.

Here the person skilled in the art will understand that the cable sections in the third aspect of the invention are equivalent to the first and second cables in the first aspect of the invention.

In an embodiment of the cable, at least one of the layers of the insulation system surrounding the electric conductor of at least one of the cable sections is made of a thermoplastic material.

In an embodiment of the cable, for each cable section, the inner semiconducting layer, the insulating layer and the outer semiconducting layer are each made of thermoplastic material.

BRIEF DESCRIPTION OF THE DRAWINGS

The present invention is described in detail by reference to the following drawings.

DETAILED DESCRIPTION OF THE INVENTION

Figure 1A:
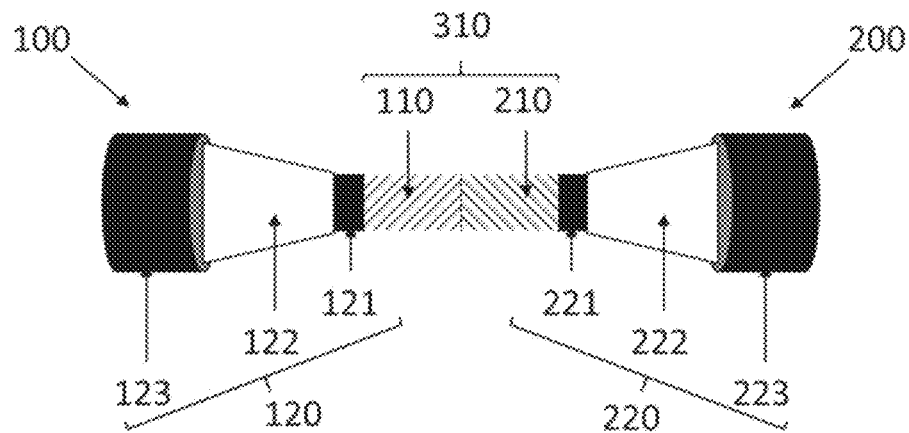
FIG. 1a-1d is a cross-sectional view of the assembly of insulation elements around a conductor.
Figure 1B:
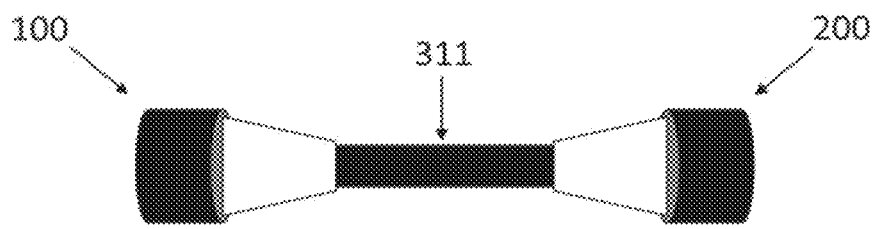
Figure 1C:
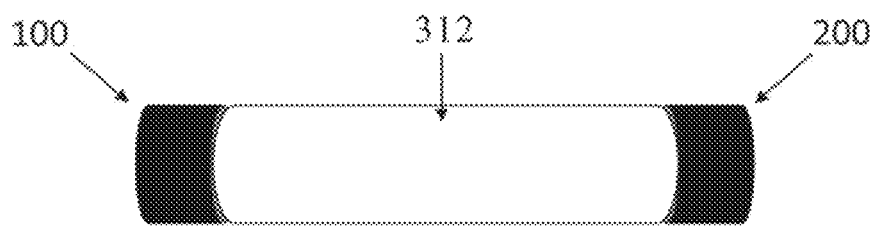
Figure 1D:
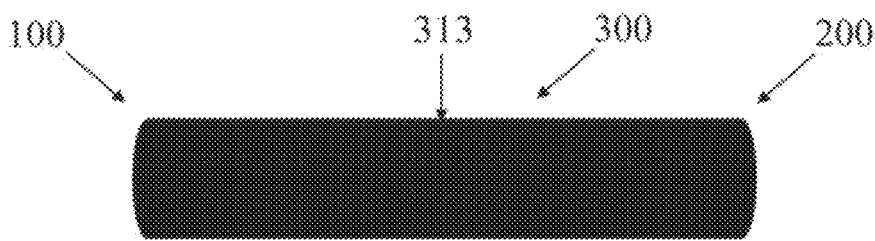

Jointing cables with a thermoplastic insulation system is challenging. The specific properties of thermoplastic polymers make it difficult if not impossible to adapt procedures known in the art, for example traditionally used with crosslinked polymer, where once set each layer will not be affected by the heating of the subsequent layer.

Jointing cables with different types of insulation is likewise challenging. A joint is commonly made up of an inner semiconducting, insulation layer and outer semiconducting layer.

A challenge in producing a fully thermoplastic insulation system is that after an additional thermoplastic layer is applied to build a joint, the additional thermoplastic layer needs to be heated to form a cylinder and insure the best contact with the previous layer. However, this additional thermoplastic layer (and potentially the previous layer underneath if made of thermoplastic material) may lose its shape during this step. This will in turn cause deformation and uniformity/homogeneity problems at the joint. These are critical parameters to insure a good insulation in the joint.

This is most critical during the preparation of the intermediate insulating layer that is traditionally much thicker than the inner and outer semiconducting layers. Due to the thickness, the intermediate insulating layer requires extensive heating and there is a risk of deforming the inner semiconducting layer. By using a crosslinked material for the inner semiconducting layer, there is virtually no risk of deformation during the preparation of the intermediate insulating layer.

Oppositely, it is not a problem for the outer layer to be made of a thermoplastic polymer material since it is traditionally much thinner than the intermediate layer and does not require extensive heating that would deform the intermediate layer.

The present invention provides an improved joint 300 comprising
- an inner layer 311 made of a crosslinked first polymeric semiconducting material, for surrounding the electric conductor joint 310,
- an insulating layer 312 made of a thermoplastic polymeric insulating material, covering an external surface of the inner semiconducting layer 311, and
- an outer layer 313 made of a second polymeric semiconducting material, covering an external surface of the intermediate insulating layer 312.

The present invention also provides an improved method for manufacturing an electric cable joint 300, the method illustrated in FIG. 1 comprising the steps of:
- providing a first and a second electric cables 100; 200, each cable comprising an electric conductor 110; 210 and an insulation system 120; 220, surrounding the electric conductor 110; 210, the insulation system 120; 220 comprising an inner semiconducting layer 121; 221, a insulating layer 122; 222 and an outer semiconducting layer 123; 223;
- joining the respective terminal portions of the electric conductors 110; 210 of the first electric cable and of a second electric cable placed axially adjacent to the first electric cable, to form an electric conductor joint 310; (FIG. 1a)
- surrounding the electric conductor joint 310 with a joint inner layer 311 of a crosslinked first semiconducting material; (FIG. 1b)
- surrounding the joint inner layer 311 of crosslinked first semiconducting material with a joint insulating layer 312 of a thermoplastic insulating material (FIG. 1c); and
- surrounding the joint insulating layer 312 of thermoplastic insulating material with a joint outer layer 313 of a second semiconducting material (FIG. 1d).

After jointing the conductor and preparing the cable joint 310 (FIG. 1a), the first layer to be applied is the inner semiconducting layer 311. This layer may be applied by lapping a pre-extruded tape. The inner semiconducting layer 311 may be a thermoplastic material containing a crosslinking agent, that will allow for the crosslinking of the inner semiconducting layer 311 upon heating or other activation (e.g. moisture or radiation). The material is heated above the crystalline melting point and shaped into a cylinder around the conductor and crosslinked. The crosslinking will give the material thermal and mechanical stability which will make the layer 311 not deformable while applying other layers. Forming an even cylinder is desirable. Alternatively, the inner semiconducting layer 311 may, depending on the circumstances, also be formed by using a pre-moulded part, or by 3D printing.

The intermediate insulating layer 312 can then be formed on top of the crosslinked inner semiconducting layer by several methods.

Tape Lapping

A first method consists in using tape lapping. In this method the intermediate insulating and outer semiconducting materials are extruded as a tape and applied helically on top of the crosslinked inner semiconducting layer 311, then heated above melting temperature, shaped and cooled. These two layers (312, 313) may be formed one after the other, or both tapes can be applied before being heated above melting temperature, shaped and cooled at the same time.

Injection Moulding or Use of Pre-Moulded Elements

Figure 2:
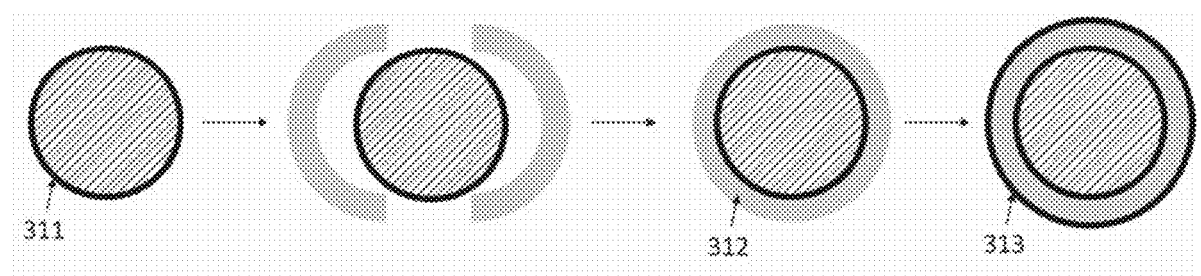
FIG. 2 is a side view of an embodiment of the jointing procedure when the intermediate layer is provided in the form of at least a pre-moulded element.

A second method could include either (i) direct injection moulding of the insulating material onto the crosslinked inner semiconducting layer 311, or (ii) the use of at least one pre-moulded element, for example as two halves (shown in FIG. 2), or in its entirety but with slits, so that it can be clamped onto the inner semiconducting layer 311.

Heat and pressure can then be applied to melt the piece(s) in place and thus form the intermediate insulating layer 312.

Compared to the traditional lapping procedure, this second method (direct injection or using pre-moulded elements) significantly reduces the amount of material interfaces and the risk for contamination, though cleanliness will as usual be a key factor for success.

By using direct injection or already having the pieces in their final form the problem of material flow may be solved since the voids associated with lapping will be close to eliminated and it will be possible to apply equal pressure on the joint and the cable on its side all the way to outside the heated zone so that the material is held in place. This is not as easy when dealing with a lapped joint because the volume change is different in the joint compared to the surrounding cable due to the voids introduced between laps. This also has the potential to be a much less labour-intensive method. If so, there is also the possibility to reduce the cost in crosslinked PE jointing since the tape extrusion and lapping steps may be avoided.

The final outer semiconducting layer 313 may be added by tape lapping, by using at least one pre-moulded element, by direct injection or any other method known in the art.

3D-Printing

Figure 3:
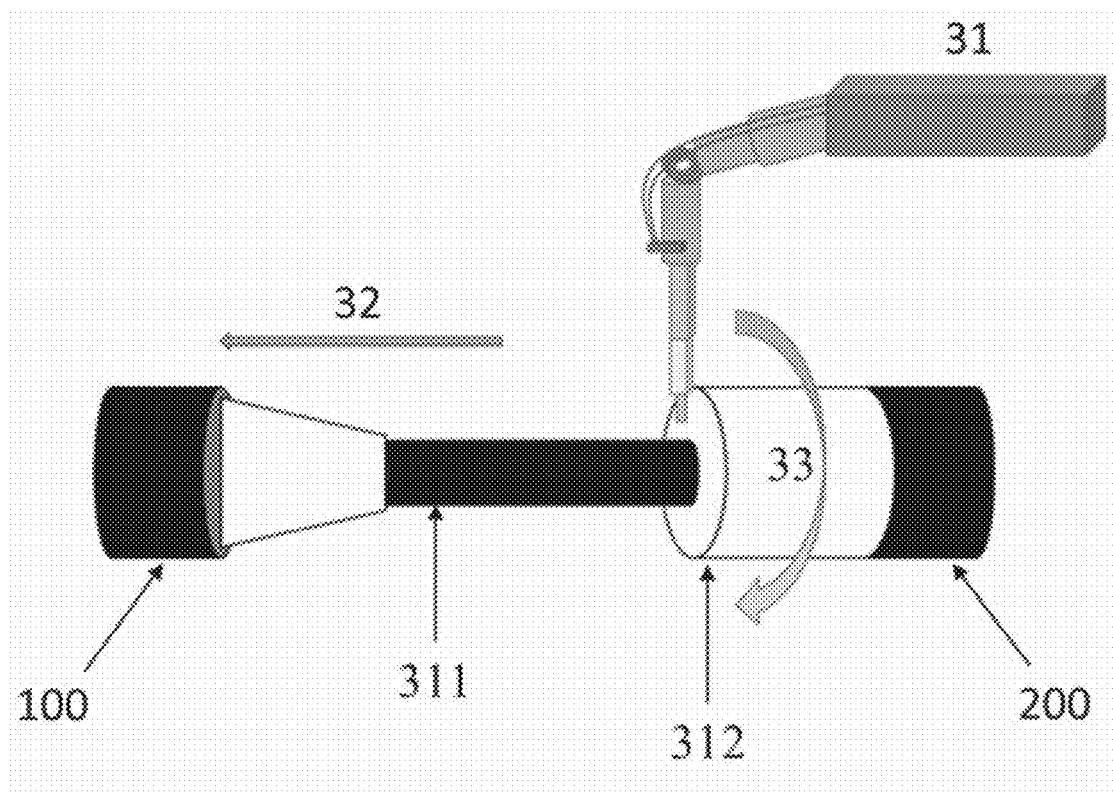
FIG. 3 is a side view of an embodiment of the jointing procedure for depositing the intermediate layer by 3D printing.

By 3-D printing the insulating material directly onto the crosslinked inner semiconducting layer, as illustrated in FIG. 3, the problem of material flow compared to applying tapes may also be solved. Moreover, it is possible to have the 3-D printing process carried out in a glove-box, highly improving the cleanliness of the process and reducing risk of electrical breakdown due to pollutants. This also has the potential to be a much less labour-intensive method.

In a word, as shown in FIG. 3, the 3D printer's arm 31 advances 32 and rotates 33 around the inner semiconducting layer 311 while depositing insulating material to form the intermediate insulating layer 312.

If so, there is also the possibility to reduce the cost in crosslinked PE jointing since the tape extrusion and lapping steps may be avoided.

Figure 4:
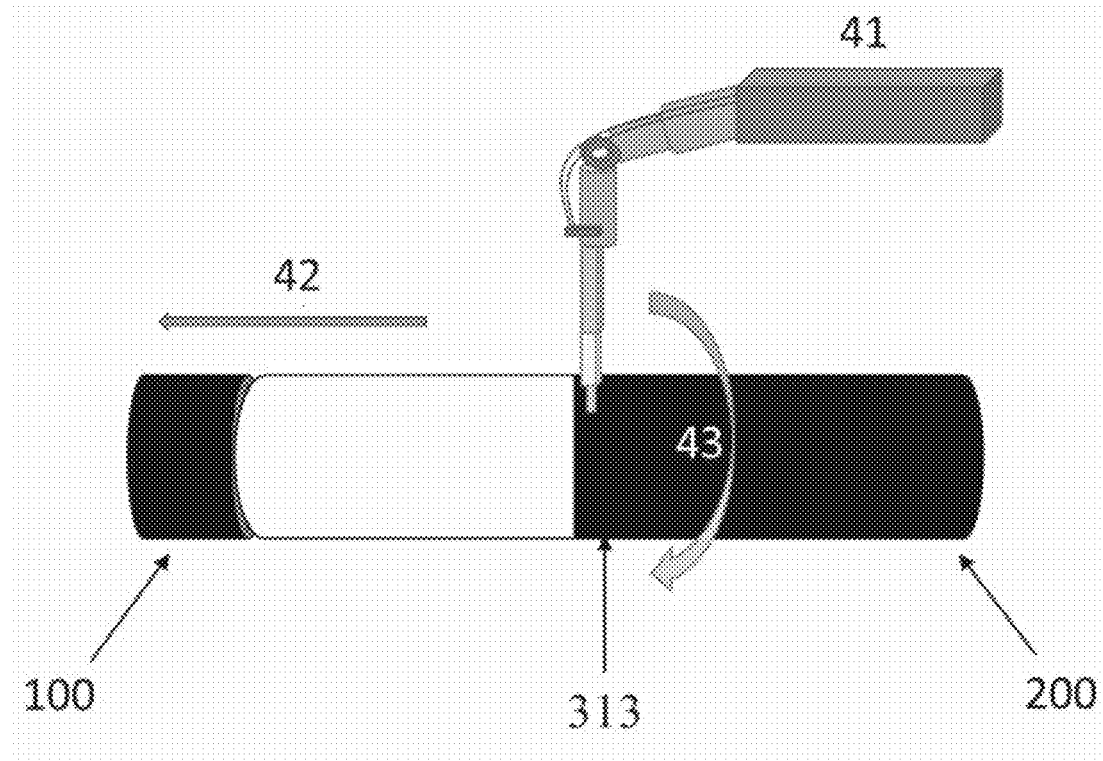
FIG. 4 is a side view of an embodiment of the jointing procedure for depositing the outer layer by 3D printing.

As shown in FIG. 4, the outer semiconducting layer may also be 3-D printed on the intermediate insulating layer. In a word, the 3D printer's arm 41 advances 42 and rotates 43 around the intermediate insulating layer 312 while depositing the second semiconducting material to form the outer semiconducting layer 313.

The methods for producing the intermediate and outer layers 312, 313 are independent from each other.

Materials

Thermoplastic materials are defined as polymers that can be melted and recast almost indefinitely. They are molten when heated and harden upon cooling. The polymer network of a thermoplastic material forms and/or breaks up as the temperature is changed.

Crosslinking is the general term for the process of forming covalent bonds or relatively short sequences of chemical bonds to join two polymer chains together.

A crosslinked polymer is a polymer that has undergone the crosslinking process. Typical crosslinking processes known in the art can be used to obtain the desired crosslinking, for example cured by heat, pressure, radiation or similar.

The inner semiconducting layer 311 may for instance be made of a polymer matrix selected from one or more polyolefins such as, for example but not limited to: polypropylenes of various stereoregularity (atactic PP, isotactic PP, syndiotactic PP etc), block copolymer polypropylenes, and PP copolymers, polyethylene (PE, HDPE, LDPE, LLDPE, MDPE) and its copolymers, thermoplastic olefins (TPOs), and a mixture of thereof.

Additives to increase conductivity such as acetylene black, furnace black, carbon nanotubes, graphene and the likes or any combination thereof may be added to the polymer, to obtain the desired semiconductive properties.

The inner semiconducting layer 311 may also comprise a dielectric fluid.

The inner semiconducting layer 311 may also comprise other additives, such as antioxidants, stabilizers, etc.

The inner semiconducting layer 311 may also comprise a crosslinking agent such as a peroxide (for example dicumyl peroxide, di-tert-butyl peroxide, cumene hydroperoxide, 1,3-bis(tert-butylperoxyisopropyl)benzene and similar).

The inner semiconducting layer 311 may also comprise a crosslinking boosting agent such as, for example, trimethylolpropane trimethacrylate (TMPTMA) and similar, or a polyolefin copolymer boasting insaturations such as vinyl groups, C—C π-bonds etc.

The intermediate insulating layer 312 may for instance be made of thermoplastic polyolefins (TPO), polypropylene, polypropylene and its copolymers with ethylene, HDPE, LLDPE, LDPE, MDPE, PE-based copolymers etc. or any combination thereof.

For example, an insulating material could comprise PP, TPO and LLDPE.

The outer semiconducting layer 313 may for instance be made of thermoplastic polyolefins (TPO), polypropylene, polypropylene and its copolymers with ethylene, HDPE, LLDPE, LDPE, MDPE, PE-based copolymers etc. or any combination thereof. Conductive filler such as furnace black, acetylene black, etc. or any combination thereof may be added to the polymer, to obtain the desired semiconductive properties.

To achieve desired material properties, both the insulating and the semiconducting materials may further comprise additives such as plasticizers, fillers (including nanomaterials), stabilizers, processing aids, etc.

The invention claimed is:

1. A joint for joining a first electric cable and a second electric cable, each cable having an electric conductor and an insulation system surrounding the electr conductor, the insulation system having an inner semiconducting layer, an insulating layer and an outer semiconducting layer, wherein the end sections of the two electrical conductors form an electrical conductor joint;
the joint comprising:
an inner layer made of a crosslinked first polymeric semiconducting material, for surrounding the electric conductor joint,
an intermediate insulating layer made of a thermoplastic polymeric insulating material, covering an external surface of the inner semiconducting layer, and
an outer layer made of a second polymeric semiconducting material, covering an external surface of the insulating layer,
wherein the second polymeric semiconducting material is a thermoplastic semiconducting material.

2. The joint according to claim 1, wherein at least one of the layers of the insulation system surrounding the electric conductor of the first and/or the second electrical cable is made of thermoplastic material.

3. The joint according to claim 2, wherein the inner semiconducting layer and the outer semiconducting layer are made of thermoplastic material.

4. The joint according to claim 2, wherein, for each cable the inner semiconducting layer, the insulating layer and the outer semiconducting layer are each made of thermoplastic material.

5. A method for manufacturing an electric cable joint, the method comprising the steps of:
a) providing a first and a second electric cables, each cable comprising an electric conductor
b) and an insulation system surrounding the electric conductor, the insulation system having an inner semiconducting layer (121; 221), an insulating layer and an outer semiconducting layer;
c) joining the respective terminal portions of the electric conductors of the first electric cable and of the second electric cable to form an electric conductor joint;
d) surrounding the electric conductor joint with a joint inner layer made of a crosslinked first polymeric semiconducting material;
e) surrounding the joint inner layer with a joint insulating layer made of a thermoplastic insulating material; and
f) surrounding the joint insulating layer with a joint outer layer made of a second polymeric semiconducting material,
wherein the second polymeric semiconducting material is a thermoplastic semiconducting material.

6. The method according to claim 5, wherein the crosslinked first polymeric semiconducting material is applied by tape lapping and optionally degassed in step c) to form the joint inner layer.

7. The method according to claim 5, wherein the thermoplastic insulating material is applied by any one of tape lapping, injection moulding, 3D-printing or as a pre-moulded part in step d) to form the joint insulating layer.

8. The method according to claim 5, wherein the second polymeric semiconducting material is applied by any one of tape lapping, injection moulding, 3D-printing or as a pre-moulded part in step e) to form the joint insulating layer.

9. A cable comprising:
two cable sections and a joint, each cable section having an electric conductor and an insulation system surrounding the electric conductor, the insulation system having an inner semiconducting layer, an insulating layer and an outer semiconducting layer,
wherein the end sections of the two electrical conductors form an electrical conductor joint;
the joint comprising:
an inner layer made of a crosslinked first polymeric semiconducting material, for surrounding the electric conductor joint,
an intermediate insulating layer made of a thermoplastic polymeric insulating material, covering an external surface of the inner semiconducting layer, and
an outer layer made of a second polymeric semiconducting material, covering an external surface of the insulating layer
wherein the second polymeric semiconducting material is a thermoplastic semiconducting material.

10. The cable according to claim 9, wherein at least one of the layers of the insulation system surrounding the electric conductor of at least one of the cable sections is made of thermoplastic material.

11. The cable according to claim 10, wherein for each cable section the insulating layer and the outer semiconducting layer are made of thermoplastic material.

* * * * *